United States Patent [19]

Langguth

[11] 3,990,401
[45] Nov. 9, 1976

[54] MARINE MAMMAL VACUUM RECOVERY SYSTEM

[75] Inventor: Arthur F. Langguth, San Diego, Calif.

[73] Assignee: The United States of America as represented by the Secretary of the Navy, Washington, D.C.

[22] Filed: Mar. 31, 1975

[21] Appl. No.: 563,770

[52] U.S. Cl. ................................. 119/29; 119/129
[51] Int. Cl.² ........................................ A01K 15/00
[58] Field of Search ............ 119/29, 1, 129; 269/21, 269/1; 114/50, 51, 16.5, 16.8; 9/313, 329, 336, 400, 14, 9; 43/23, 6; 116/DIG. 8, 124 B, 124; 294/64 R, 66, 65.5

[56] References Cited
UNITED STATES PATENTS

| 2,775,951 | 1/1957 | Billmeyer | 116/124 |
| 3,266,668 | 8/1966 | Davis | 116/124 B |
| 3,667,417 | 6/1972 | Clinkenbeard | 114/51 |
| 3,745,976 | 7/1973 | Seiple | 119/129 |
| 3,753,422 | 8/1973 | Seiple | 119/29 |

Primary Examiner—Louis G. Mancene
Assistant Examiner—Peter K. Skiff
Attorney, Agent, or Firm—Richard S. Sciascia; Ervin F. Johnston; William T. Skeer

[57] ABSTRACT

A recovery system for attaching a line to an underwater object includes a facially worn tool holder adapted to be carried by an underwater mammal which supports a surface engaging tool at the forward end thereof. A signalling mechanism is also included to be actuated on attachment of a tool to an underwater object.

7 Claims, 2 Drawing Figures

MARINE MAMMAL VACUUM RECOVERY SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of animal husbandry. More particularly, this invention pertains to animal operated tools. By way of further characterization, this invention pertains to marine mammal operated tools. In still greater particularity, this invention pertains to recovery attachment devices carried by marine mammals. By way of further characterization, but without limitation thereto, this invention will be described as it pertains to a sea-lion operated recovery tool.

DESCRIPTION OF THE PRIOR ART

Use of marine mammals to operate attachment and recovery tools for underwater objects, although esoteric, is known in the prior art. For example, perhaps the best known, is shown by U.S. Pat. No. 3,722,941 issued on Mar. 27, 1973 to Ronald L. Seiple for "Marine Mammal Underwater Attachment and Recovery Tool". While satisfactory for its intended purpose, such known tools have, in the past, been designed to cooperate with only a limited class of objects. That is, the aforereferenced recovery tool is designed for cylindrical objects. Of course, it is sometimes desirable to recover other than cylindrical objects from the underwater environment.

Prior attempts to recover such underwater objects as may present plain surfaces have employed electromagnets which are controlled from the surface and, on occasion, vacuum suction cups. The former is limited to objects constructed of magnetic material and the latter is dependent upon the engagement of lightweight objects. Limitation of the weight of the object is imposed by the limited amount of vacuum action which may be obtained in the underwater environment and the reduction of pressure outside the vacuum engagement as the object is raised to the surface.

Additionally, prior art devices have required the underwater animal or diver to attach the recovery tool to the object to be recovered and then return to the surface or otherwise independently signal the surface to indicate that the tool has been attached.

SUMMARY OF THE INVENTION

This invention provides a marine mammal, such as a California sea lion, with a nose carried tool holder upon which positioning means is provided to locate a compound vacuum device in a forward-facing direction. Provision is also made for a marker buoy to be released upon withdrawal of the sea lion from the nose cup, such as to mark the location of the underwater object and thereby permit the sea lion to swim free without the encumbering tether.

STATEMENT OF OBJECTS OF INVENTION

It is accordingly an object of this invention to provide an improved underwater recovery tool.

A further object of this invention is to provide an underwater recovery tool which may be conveniently carried and operated by a free-swimming marine mammal.

A further object of this invention is the provision of an underwater recovery tool which may be attached to a wide variety of underwater objects.

A still further object of this invention is the provision of an underwater recovery tool employing a compound vacuum attachment cup.

Still a further object of this invention is the provision of an underwater recovery tool having an attachment-release signal buoy attached thereto.

Yet another object of this invention is the provision of a marine mammal operated recovery tool permitting the marine mammal to be free-swimming in the ocean environment.

These and other objects of the invention will become more readily apparent from the ensuing specification when taken with the drawings.

DESCRIPTION OF THE PREFERRED EMBODIMENT

Figure 1:
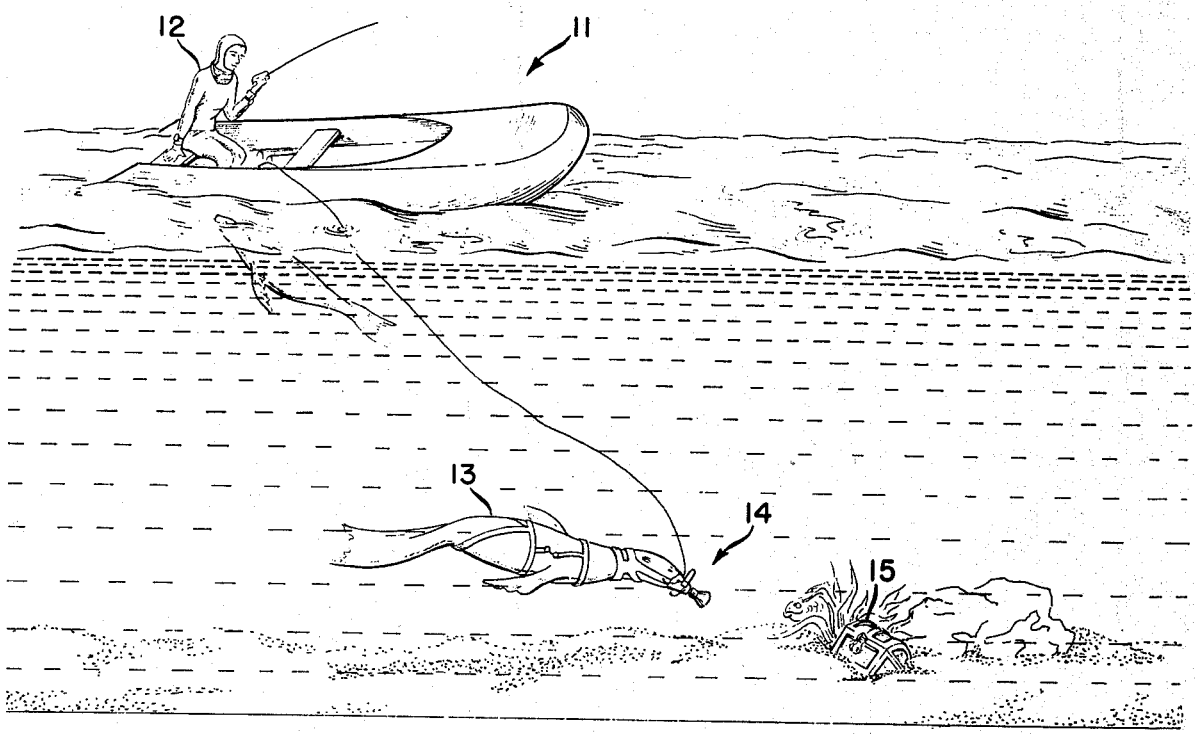
FIG. 1 is a perspective view showing the invention in its operational environment.
Figure 2:
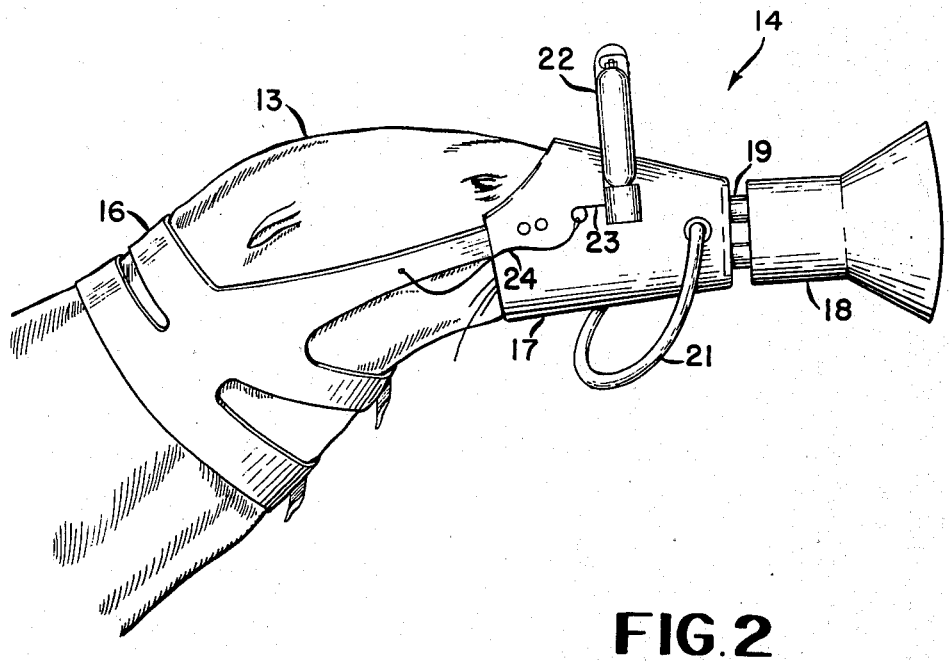
FIG. 2 is a side elevation of the invention as it is worn by a marine mammal.

Referring to FIG. 1, a surface vessel 11 provides a base of operations for a operator 12 in charge of one or more marine mammals 13. Marine mammal 13 carries the attachment tool of the invention, indicated generally at 14, in search for a recoverable underwater object, such as shown at 15. It should be noted that marine mammal 13 may be any trained, aquatic animal, however, in the practice of the invention those animals of the order Pinnipedia and of the family Odariidae have proven most trainable and adaptable for these purposes. Particularly, the Zalophus Californianus, commonly known as the California sea lion, have proven themselves particularly capable. Likewise, the surface vessel 11 may be any craft from which such animals and their trainers may find convenient for operational purposes. The inflatable type vessel shown has proven to be particularly advantageous in handling the animals and permitting their entrance and exit from the water. Referring to FIG. 2, it may be seen that animal 13 is wearing conventional harness structure 16 and a suitable shaped nose cup 17. Nose cup 17 may be fabricated of any resilient material and of a shape which is compatible with the harness and tool to be employed. Particularly, it should be noted that the nose cup described in U.S. Pat. No. 3,745,976 issued on July 17, 1973 to Ronald L. Seiple for "Resilient Marine Mammal Nose Cup" has proven satisfactory.

At the forward end of nose cup 17, a compound vacuum cup 18 is positioned in a forward-facing direction by means of suitable positioning means 19. Positioning means 19 may comprise of state-of-the-art mechanical connectors or threaded fasteners which cooperate with a reinforced section on nose cup 17.

Compound vacuum cup 18 may be any small, portable compound vacuum attachment device. For example, that described in U.S. Pat. No. 3,957,296 application granted on May 18, 1976, entitled "Vacuum Multiplier", has proven satisfactory in developmental models. Of course, other vacuum attachment arrangements known in the art, such as that shown by U.S. Pat. No. 3,665,509 issued May 23, 1972 to James H. Elkins for "Underwater Electrical Connector" and might, with suitable modification, be used.

A loop 21 passes through nose cup 17 and is useful in assisting mammal 13 to fit cup 17 to his face and, in instances when the animal is permitted to swim freely, provides a secondary attachment for a retrieval line to raise underwater object 15.

A small, conspicuously-colored float 22 is attached to nose cup 17 by means of a suitable release mechanism such as might be provided by pin 23. Pin 23 is attached to harness 16 by means of a short tether 24. When mammal 13 withdraws his nose from cup 17, pin 23 is withdrawn and float 22 rises to the surface to indicate to operator-trainer 12 that attachment tool 14 has been released by mammal 12 and to mark the location of such release. A float 22 may be a conventional, oceanographic marker float construction and may include the float portion of a squib ejected buoy such as shown in U.S. Pat. No. 3,702,014 issued on Nov. 7, 1972 to James L. Rabon et al.

The foregoing description while sufficient to enable a person versed in the marine engineering and animal husbandry arts to make the invention is believed to be better understood with reference to the following description of contemplated mode of use.

Trainer-operator 12 propels himself and animal 13 in surface vessel 11 to the region which a search is to be made for an underwater object 15. Mammal 12 is placed over the side and nose cup 17 together with compound vacuum tool 18 is attached to the animal's nose. In some instances, animal 13 swims with a tether attached to the recovery tool as illustrated in FIG. 1. In other instances where the duration of the location swim cannot be accurately determined, it may be to the operator-trainer 12's advantage to permit animal 13 to swim freely. In such instances, it may be desirable to attach a float locator and restainer device to harness 16 such as to limit the range and mobility of the marine mammal without risk of entanglement. Such restraining devices are known in the art and may, for example, be that illustrated in U.S. Pat. No. 3,753,422 issued on Aug. 21, 1973 to Ronald L. Seiple for "Marine Mammal Automatic Float Locating and Restraining Device and Method".

Mammal 13 swims until he discovers the location of the underwater object 15 and approaches the object such as to engage the vacuum recovery tool 18 on a surface of object 15. Marine mammals, such as the aforedescribed California Sea Lion, have a great training flexibility and may be trained to recognize particularly desired objects and to attach compound vacuum tool 18 thereto with a very high rate of dependability. Vacuum cup 18 is of the type having a vacuum assist such that the resiliency of the walls thereof are not the sole source of vacuum attachment force, as previously noted.

After attachment, mammal 13 withdraws his nose from nose cup 17 and returns to vessel 11 in accordance with his trained routine. Upon withdrawal of his nose from nose cup 17, pin 23 is withdrawn from the attachment of float 22 which permits the float 22 to rise to the surface to mark the location of underwater object 15. Of course, if a tethered tool is used, object 15 may be raised by use of the tethered line. More commonly, however, the location is marked and operator-trainer 12 investigates the find himself and proceeds with the recovery along well established marine salvage procedures.

The foregoing description taken with the appended claims constitute a disclosure such as to enable a person skilled in the marine engineering and animal husbandry arts having the benefit of the teachings contained therein to make and use the invention. Further, the structure herein described meets the objects of invention, and generally constitutes a meritorious advance in the art unobvious to such a person not having the benefit of these teachings.

Obviously, many modifications and variations are possible in the light of the above teachings, and it is therefore understood that the invention may be practiced otherwise than as specifically described.

What is claimed is:

1. A recovery system for underwater objects comprising:
    a removable tool carrier configured for facial engagement by a marine mammal;
    a compound vacuum cup, planar surface engaging tool attached to said removable tool carrier; and
    signal means connected to said removable tool carrier to be carried thereby and configured for actuation by disengagement of said removable tool carrier from said marine mammal for indicating to surface personnel said removable tool carrier has been disengaged from said marine mammal generally by said surface engaging tool engaging an underwater object.

2. A recovery system according to claim 1 in which said signal means includes a selectively releasable float.

3. A recovery system according to claim 2 in which said float is connected to said removable tool carrier by means of a withdrawable pin and a tether line.

4. A recovery system according to claim 1 in which said planar surface engaging tool is attached to said removable tool carrier by positioning means to effect engagement of a flat surface thereby.

5. A recovery system according to claim 1 in which said compound vacuum cup is attached to said removable tool carrier by forward facing positioning means to facilitate engagement of a flat surface thereby.

6. A recovery system according to claim 5 in which said signal means includes a selectively-releasable, tethered float.

7. A recovery system according to claim 6 in which said float is connected to said removable tool carrier by means of a withdrawable pin, which is effectively connected to the aforesaid marine mammal to permit the animal to withdraw said pin upon disengagement of said removable tool carrier, and a lightweight tether line.

* * * * *